United States Patent [19]

Stern et al.

[11] Patent Number: 4,845,639
[45] Date of Patent: Jul. 4, 1989

[54] ROBOTIC SEALANT CALIBRATION

[75] Inventors: Howard Stern, Greenlawn; Alex Mauro, Wheatley Heights; Fereydoun Maali, Stony Brook; Frank Holetsky, Centereach, all of N.Y.

[73] Assignee: Robotic Vision Systems, Inc., Hauppauge, N.Y.

[21] Appl. No.: 131,829

[22] Filed: Dec. 11, 1987

[51] Int. Cl.$^4$ ................................................ B66C 1/00
[52] U.S. Cl. ............................... 364/513; 364/571.01; 901/3; 901/43
[58] Field of Search ............... 364/513, 167, 559, 571, 364/571.01, 571.02; 901/3, 42, 43; 118/323, 326, 695; 318/568, 574; 239/61, 69, 70; 137/624.11

[56] References Cited

U.S. PATENT DOCUMENTS

| | | | |
|---|---|---|---|
| 4,278,046 | 7/1981 | Clarke et al. | 118/695 |
| 4,532,148 | 7/1985 | Vecellio | 901/43 |
| 4,644,897 | 2/1987 | Fender | 901/43 |
| 4,753,569 | 6/1988 | Pryor | 364/559 |
| 4,785,760 | 11/1988 | Tholome | 118/323 |

Primary Examiner—Allen MacDonald
Attorney, Agent, or Firm—Max Fogiel

[57] ABSTRACT

A stream calibration arrangement for visually determining the position and orientation of a sprayed material stream. Use of a stream calibration fixture to determine adjustments to an adjustable spray gun mount to realign a spray stream without altering the taught path of a robot carrying the spray gun. Alternatively, the stream is realigned by altering the taught robot path and requiring no gun mount adjustment. Stream realignment is also carried out automatically with and without gun mount adjustments. Machine vision is used for automatic stream realignment.

18 Claims, 4 Drawing Sheets

ROBOTIC SEALANT CALIBRATION

BACKGROUND OF THE INVENTION

The sealant spray gun calibration is an integral part of robotic sealant applications.

In a typical robotic sealant system objects to be sealed are the spot welded seams of cars that have been primer-coated. Panels of the car are thin sheet metal stamped for reinforcement and the edges of these panels have burrs from the shearing operation; in addition, there are small concaves and distortions around the seams due to spot welding.

As a result, the seams become irregular lines. To effectively seal the seams with an economical amount of sealing material, the spray gun must accurately track the complex seams during the sealing operation. To obtain this accuracy the working tool center point of the spray stream must be fixed in space (calibrated) prior to path teaching (programming) the robot.

To maintain accuracy, the sealant gun has to be adjusted every once in a while because of the following reasons: the wear of the gun nozzle; robot collision causing distortion of gun, nozzle, etc.; and change of nozzle angle after the replacement of the gun or nozzle.

The conventional calibration method is to adjust gun orientation by moving the robot or the gun on its mounting. Although this method can adjust the position and orientation of the gun, it is very difficult to predict the direction of the sealant stream.

Also, the space in which the robot arm works may be severely restricted so that no alteration of the robot arm programmed path may be tolerated.

SUMMARY OF THE INVENTION

It is an object of the present invention to overcome the prior art disadvantages.

In particular, it is the object of the present invention to provide a method and an arrangement for more readily calibrating the working tool center point of a spray stream of a spray gun mounted on a robot arm.

In keeping with this object and with still others which will become apparent as the description proceeds, the important characteristics of the invention are: the exact position and orientation of the gun can be set without moving the robot to thereby leave the robot path unaltered; or the gun can be fixed to the robot arm and the robot path modified automatically based on a measured tool realignment.

A first embodiment of the present invention comprises the steps of: providing manual adjustments for aiming a spray gun attached to a robot arm; providing a spray stream calibration fixture; bringing the robot to a calibration point at the calibration fixture; setting the adjustments at the centers of their ranges; teaching a calibration location and orientation that aligns the spray stream to the calibration fixture; and adjusting on subsequent realignments the manual adjustments to return the spray stream to the calibrated location and orientation.

A second embodiment of the present invention comprises the steps of: providing motorized adjustments for aiming a spray gun attached to a robot arm; providing a 3-D measurement sensor; bringing the robot to a calibration point; setting the motorized adjustments at the centers of their ranges; measuring the spray stream; modifying the robot calibration location and orientation if the spray stream is not adequately centered in the measurement volume; recording the measured spray stream location and orientation after modifications; and adjusting on subsequent realignments the motorized adjustments to return the spray stream to the recorded calibration location and orientation.

A third embodiment of the present invention comprises the steps of: providing a spray gun attached to a robot arm; providing a 3-D measurement sensor; bringing the robot to a calibration point; measuring the spray stream; modifying the robot calibration location and orientation until the spray stream is centered in the measurement volume; and developing on subsequent realignments new tool point offset and orientation specifications for the robot to alter its taught path.

The three methods of the preceding embodiments contain steps that are interchangeable which would result in altered methods with equally valid results. Thus, such variation is anticipated. The capabilities of various robots to accommodate different kinds of path corrections will influence the choice of implementation.

The invention will hereafter be described with reference to an exemplary embodiment, as illustrated in the drawings. However, it is to be understood that this embodiment is illustrated and described for the purpose of information only, and that nothing herein is to be considered limiting of any aspect of the invention.

DESCRIPTION OF THE PREFERRED EMBODIMENT

Figure 1:
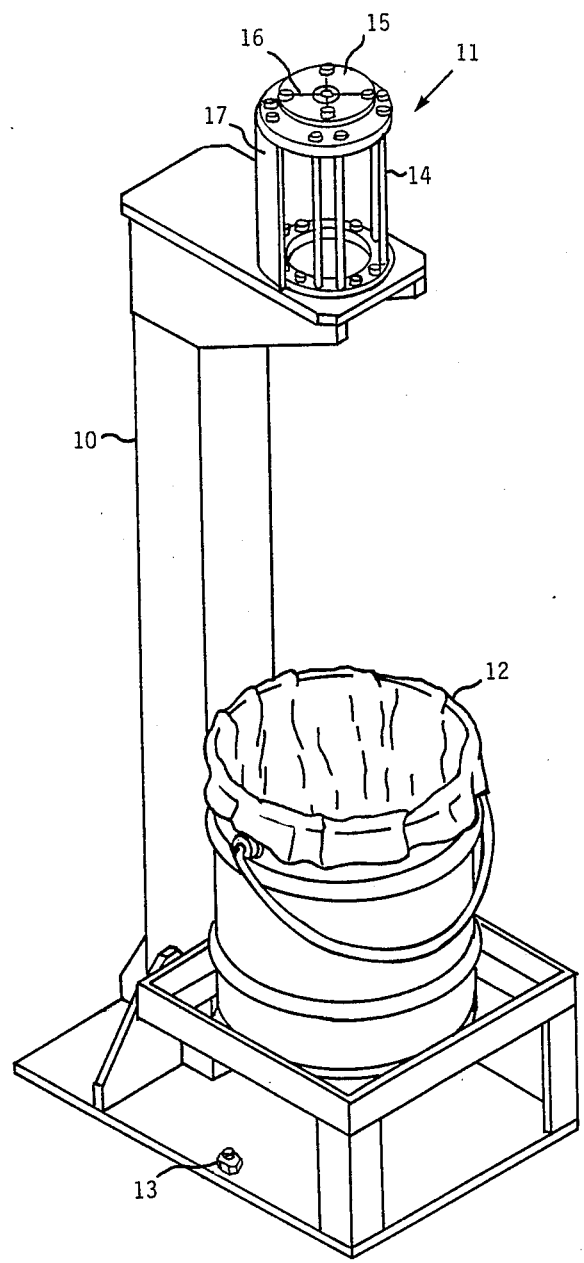
FIG. 1 is a perspective view and shows the calibration fixture, stand and purge bucket.

In a first embodiment of the present invention, manual adjustment of the spray head and a calibration fixture providing a visual aid to the robot operator will be described. A detailed view of the spray gun with manual adjustments is given in FIG. 3. Views of aligning the gun nozzle are given in FIG. 2. FIG. 1 shows the complete spray gun calibration stand 10 with a calibration fixture mounted on top. Stand 10 is fastened to the floor with bolts 13 within the robot work area, but out of the way of the normal robot activity.

To calibrate the robot spray stream, the robot mounted gun nozzle is brought to the compliant target disc 15. This is done preferably prior to teaching the robot spray paths.

However, it is possible to calibrate after teaching, if the gun is not readjusted. All guns adjustments should be at nominal to allow maximum readjustment range when realigning at later times. The gun nozzle is brought as close to disc 15 as practical, and centered visually using centerline markings 16 and the robot's teach pendant (controls).

Disc 15 is made compliant to avoid excess stress on the gun nozzle if the nozzle is brought inadvertently into contact with the disc. The spray stream is activated and passes through a hole in disc 15, through fixture 11 and into the purge bucket 12. The stream is then observed by the robot operator through the alignment bars 14 and the robot position, and orientation, is altered until the stream is centered and parallel to the two orthogonal sets of alignment bar pairs. That position and orientation is then recorded by the robot as its calibrated location. The background shroud 17 makes it easier to sight the stream.

Figure 2A:
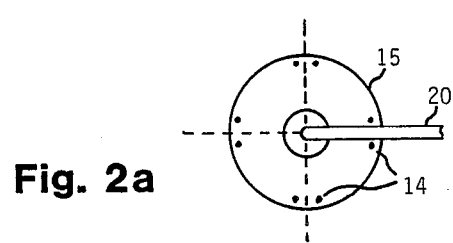
FIG. 2a is a plan view of the calibration fixture.
Figure 2B:
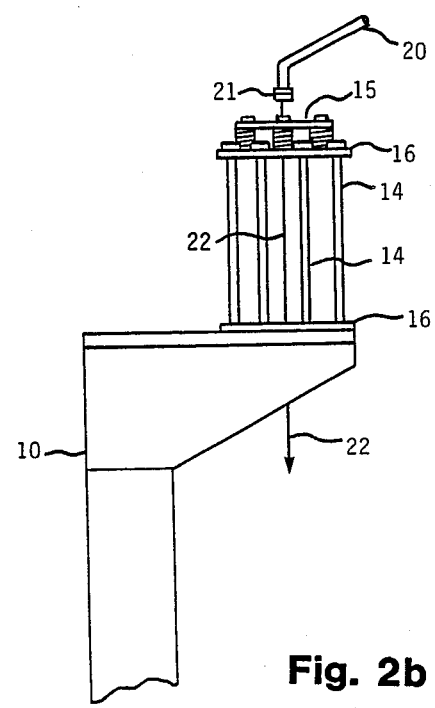
FIG. 2b is a side view of the calibration fixture.

FIG. 2 illustrates the extension nozzle 20 and orifice 21 in proper alignment to bring stream 22 parallel to the two orthogonal sets of alignment for pairs 14. The stream 22 is also centered in orthogonal directions by centerline markings 16.

Figure 3:
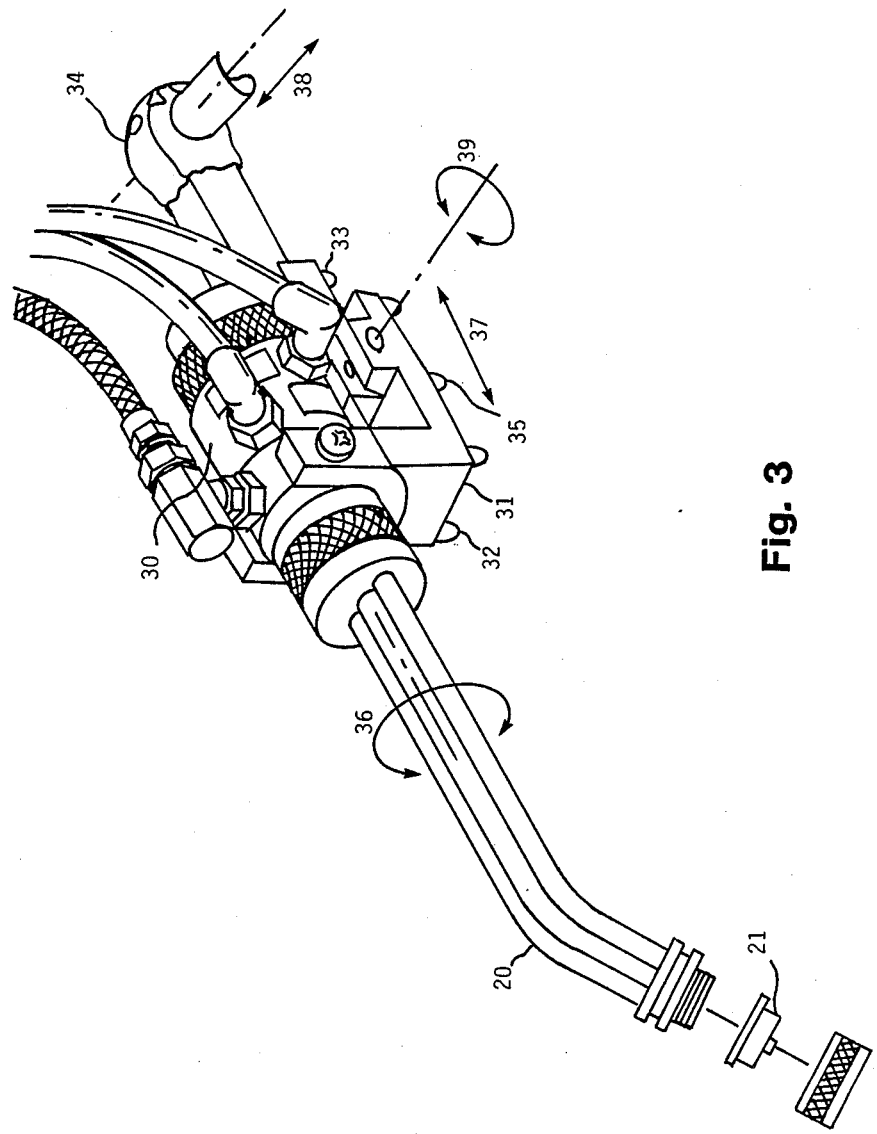
FIG. 3 is a perspective view of the spray gun assembly showing 4 axes of manual adjustment.

At any future time the robot may be brought back to its taught calibration position and checked for alignment. The stream may go out of alignment due to orifice wear, bending of the nozzle or as a result of replacing the gun or nozzle. Since it may be undesirable to alter the taught path, adjustments may be provided on the gunmount as shown in FIG. 3. If the stream is seen to be out of alignment, then the adjustments 32 (roll) 33 (in/out) 34 (side/side) 35 (pitch) are used to reposition orifice 21 and nozzle 20 to realign stream 22 without changing the robot's position. Since the stream is realigned without any alteration to the robot path, the spray will be consistent with original performance within the robot's repeatability capability.

To provide this ability to leave the robot path unmodified and adapt to stream variations, spray gun 30 is mounted to the robot arm via gun holder assembly 31 that attaches to the arm via side/side adjustment 34 which provides offsetting stream 22 in directions 38. Holder 31 can slide in direction 37 via adjustment 33 to offset stream 22 in direction 37. Holder 31 can also pivot in direction 39 via adjustment 35 to modify the stream 22 orientation in direction 39. Lastly, gun 30 can roll in direction 36 via adjustment 32 which, due to a bend in nozzle 20, provides a second angular adjustment.

Ideally, 6 adjustments are required. These are three linear translations that are mutually orthogonal with rotations around each. However, it is often possible to obtain satisfactory performance with fewer adjustments such as the combination shown in FIG. 3. If it is not possible to exactly align stream 22 to be centered and parallel to the alignment bars 14, then the stream should be made to match the condition as closely as possible and still pass through the central location at a distance form from orifice 21, as will be encountered when spraying the workpiece.

Figure 4:
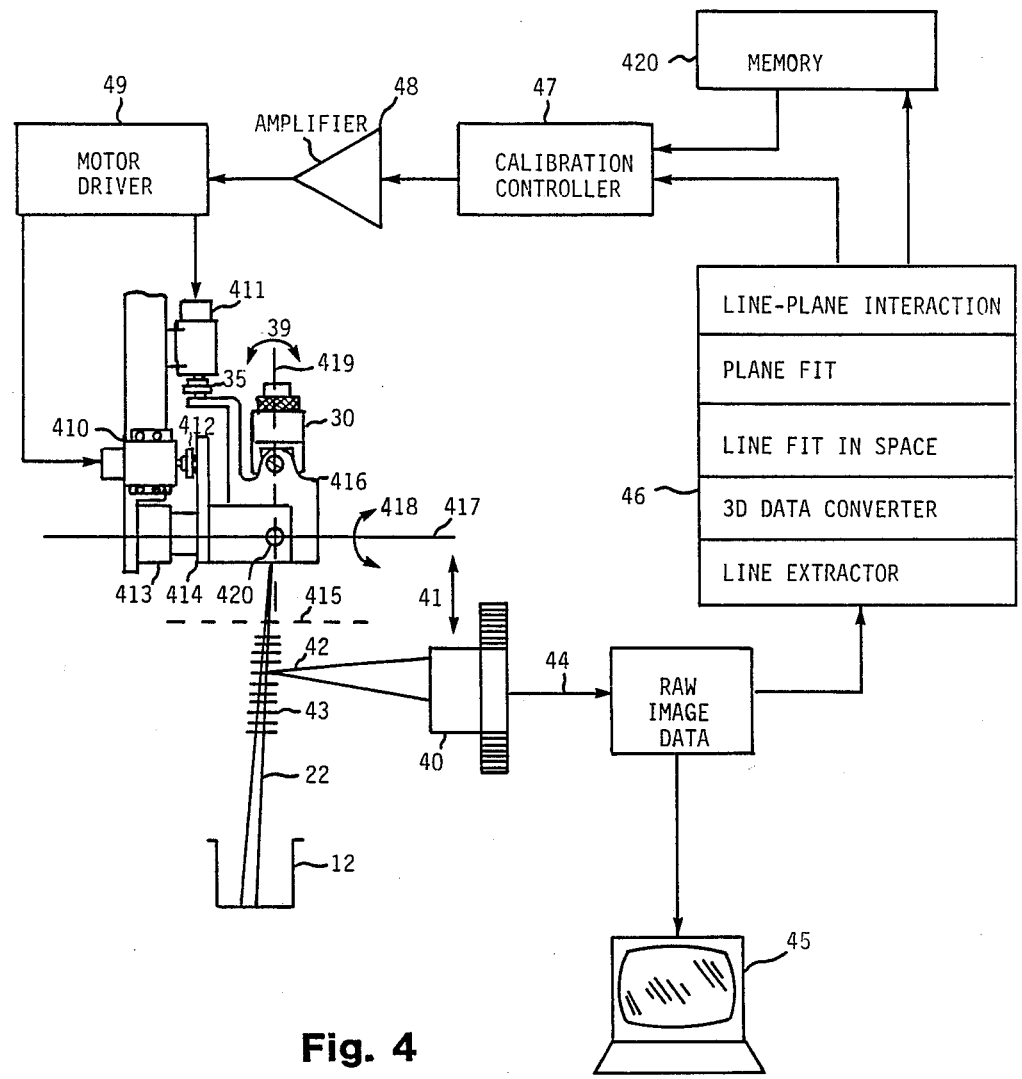
FIG. 4 is a schematic diagram of an automated spray stream calibration system using a 3-D measurement sensor and pivoted spray gun.

In a second embodiment of the invention the concepts of the first embodiment are automated. Machine vision replaces human vision and as a result of its mensuration capability no calibration fixture is required. FIG. 4 illustrates the system with a machine vision sensor 40 capable of making precise three-dimensional measurements within its field of view 42. Typically, sensor 40 will employ optical triangulation. Two 2-dimensional vision systems mounted to view the stream 22 in orthogonal directions can be equally as effective.

If the sensor 40 provides only a single cross sectional measurement of stream 22, then it is transported in directions 41 to make measurements at several cross sections 43, to fully describe the position and orientation of stream 22. The raw image data 44 coming out of sensor 40, offset to show scan 41, can be displayed on a monitor 45 to assist in initial setup. The data 44 are processed by visual link 46 to determine needed position and orientation corrections of stream 22, which are required to center the stream or realign it to a calibrated location.

To initially calibrate the system, it is again preferable to set all adjustments to the center of their ranges and then teach the spray paths with that setting to reserve maximum adjustability.

For the mount shown, only two motorized adjustments are used. It is possible to obtain sufficient correction with just two angular corrections by designing the mount to place the orifice on axis 419 of gun 30 at the intersection of axes 417 and 420. In this manner, a change in orientation made to correct the angle of stream 22 will not cause an offset error. Thus, no offset adjustments are required. Gun 30 is held by pitch assembly 416 that pivots in directions 39 about axis 420 (perpendicular to the plane of the drawing) as a result of rotating eccentric cam and slot adjustment 35 driven by motor 411. Assembly 416 pivots on yaw assembly 414 which rotates assembly 416 in directions 418 about axis 417 of mount 413. Motor 410 drives eccentric cam and slot adjustment 412 to rotate assembly 414. A plane 415 represents the surface to be sprayed.

The location of plane 415 is known via measurements relative to sensor 40 and forms a part of the calibration station. The calibration location of the robot is chosen to place the orifice of gun 30 a distance along gun axis 419 from plane 415, equal to the nominal distance from gun 30 orifice along axis 419 to the surface being sprayed. Since the machine vision can accurately measure the stream 22 location and orientation, the stream does not have to be accurately positioned or oriented when calibrating. Whatever location is calibrated is recorded by the system and realignment merely tries to bring the stream 22 back to that recorded location. Of course, it is possible to bring the stream to a predetermined location for calibration.

The visual link processing 46 begins by examining the raw data 44 which is given in the 2-dimensional coordinates of the camera of sensor 40. A typical output of sensor 40 will contain data across the width of stream 22 for each measurement 43 along scan 41. The line extractor of processor 46 will detect the start and end of the stream 22 measurement data for each measurement 43 along scan 41. A filter then removes points that do not correlate along the length of the scan 41. All start edge points should fall along a line. Those points that correlate closely with a line are retained, and the remainder rejected. The same filtering is applied to the end edge points. The points are then converted from the 2-dimensional coordinate space to 3-dimensional coordinate space, using the normal conversion process of the sensor system.

The start edge and end edge points are then each least squares fit to lines in 3-D space. Since the lines will not necessarily be coplanar, the points are also least squares fit to a plane and the lines projected upon the plane, to give two coplanar lines representative of the stream 22 extremities. Being coplanar, mid points between the lines will form a line in the plane that is very representative of the stream 22 core. The equation of this core line is then stored for reference in memory 420. An intersection of the core line and the reference plane 415 can also be stored. This completes the calibration.

For realignment, the robot is returned to its calibrated location, and the stream is measured and processed as during calibration. However, the result is sent to calibration controller 47 rather than memory 420, and controller 47 receives the stored reference from memory 420 for comparison. Controller 47 is programmed to determine the angular change of the stream 22 core line in the two directions of adjustment 39 and 418. Correction signals are then generated and sent to the motor driver 49, via buffer amplifier 48, to drive motors 411 and 410 and null out the angular changes. Sensor 40 can then verify the system performance by measurement and a second correction can be made if needed.

When fewer than six degrees of corrective adjustment are provided, it may be necessary to trade off residual errors for best performance. If the orifice has been translated a small amount, then making the angle measured equal to the calibrated angles will result in the core line being parallel to the calibrated core line—except translated. Compromise corrective angles could be used that reduce the translation errors at plane 415, and maintain the parallelism with the calibrated core line as much as possible.

In a third embodiment of the invention, the spray gun 30 is simply mounted fixed to the robot arm, thereby eliminating pivoting mounts, motors and drivers. The stream 22 is calibrated in the same manner as in the second embodiment, and the equation of the core line is stored in memory 420. When a realignment measurement is made and the equation of the core line determined, calibration controller 47 determines the change in intersection with plane 415, and either provides translation corrections for the operator to manually enter as workpiece offsets or automatically transmits the corrections to the robot. The robot must have the capability of translating its taught paths accordingly. If the robot can accept corrections to the tool point position and orientation relative to its tool plate, then both translation and angular errors can be corrected. The calibrated core line intersection with plane 415 provides the calibration reference tool point and orientation. The realignment measured core line intersection with plane 415 provides a new tool point and orientation from which the robot can compute the corrected spray paths to compensate for the change.

In both automated systems the coordinate system of the sensor 40 must be in known relationship to the coordinate system for correction—the pivoted assemblies for the second embodiment and the robot for the third embodiment. Standard procedures for alignment of the coordinate axes may be followed, or mathematical corrections may be used to relate the two coordinate systems where misaligned. The measurement sensor 40 can be used to make the necessary alignment measurements.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method of enabling realignment of a sprayed material stream comprising the steps of: providing alignment references to assist visual alignment; providing a robot with a sprayed material stream; providing adjustments for orienting and translating said sprayed material stream: setting said adjustments to nominal; and teaching a calibration point to said robot such that said material stream is in a readily identified position and orientation relative to said alignment reference.

2. A method as defined in claim 1, wherein said adjustments are in said robot only.

3. A method for realigning a robot borne sprayed material stream without altering a taught robot path comprising the steps of: calibrating a robot borne sprayed material stream by:
providing alignment references to assist visual alignment; providing a robot with a sprayed material stream; providing adjustments for orienting and translating said sprayed material stream; setting said adjustments to nominal; and teaching a calibration point to said robot such that said material stream is in a readily identified position and orientation relative to said alignment reference;
ordering said robot to said taught calibration point at a time of realignment; and adjusting said stream position and orientation without altering said robot location until said stream is in alignment with said readily identified position and orientation relative to said alignment reference.

4. A method for realigning a robot borne sprayed material stream requiring no adjustment of stream position or orientation relative to a robot arm supporting means forming said material stream, comprising the steps of: calibrating a robot borne sprayed material stream by:
providing alignment references to assist visual alignment; providing the robot with a sprayed material stream; and teaching a calibration point to said robot such that said material stream is in a readily identified position and orientation relative to said alignment reference:
ordering said robot to said taught calibration point at a time of realignment; and entering path offset values to bring said stream into close conformance with said alignment reference.

5. A method for realigning a robot borne sprayed material stream requiring no adjustment of stream position or orientation relative to a robot arm supporting means forming said material stream, comprising the steps of: calibrating a robot borne sprayed material stream by:
providing alignment references to assist visual alignment; providing the robot with a sprayed material stream, and teaching a calibration point to said robot such that said material stream is in a readily identified position and orientation relative to said alignment reference;
ordering said robot to said taught calibration point at a time of realignment; and entering modified tool point position and orientation values until said stream is in alignment with said readily identified position and orientation relative to said alignment reference.

6. A method for enabling realignment of a sprayed material stream comprising the steps of: providing a three-dimensional measurement system: providing a robot with a sprayed material stream; providing automated adjustments for orienting and translating said sprayed material stream; setting said adjustments to nominal; teaching a calibration point to said robot such that said material stream is substantially centered in the measurements range of said measurement system; measuring the width of said stream with said measurement system at least two points along the length of said stream; processing measurements obtained from said measurement system; said processing comprising:
detecting the start and end of data along the width of said stream and making a list of start data and a list of end data; removing data from each list not correlating within a given tolerance to a line representative of the majority of data of said list; converting the remaining data of said lists to three-dimensional coordinate measurements, said data forming start and end three-dimensional list data; least square fitting said three-dimensional list data to lines in three-dimensional space with a line for each said list; least square fitting said three-dimensional list data to a plane with one plane for the combined data of said lists; projecting two of said lines in three-dimensions upon said plane along a surface normal of said plane; determining the equation of a line formed by points midway between said line projections; and storing said equation in a memory for reference.

7. A method as in claim 6 wherein said stream adjustments are provided by said robot only.

8. A method for realigning a robot borne sprayed material stream without altering the taught robot path comprising the steps of: providing a three-dimensional measurement system; priding a robot with a sprayed material stream; providing automated adjustments for orienting and translating said sprayed material stream; setting said adjustments to nominal; teaching a calibration point to said robot such that said material stream is substantially centered in the measurements range of said measurement system; making a first measurement of the width of said stream with said measurement system at least two points along the length of said stream; processing said first measurements obtained from said measurement system; said processing comprising:

detecting the start and end of data along the width of said stream and making a list of start data and a list of end data; removing data from each list not correlating within a given tolerance to a line representative of the majority of data of said list; converting the remaining data of said lists to three-dimensional coordinate measurements, said data forming start and end three-dimensional list data; least square fitting said three-dimensional list data to lines in three-dimensional space with a line for each said list; least square fitting said three-dimensional list data to a plane with one plane for the combined data of said lists; projecting two of said lines in three-dimensions upon said plane along a surface normal of said plane; and determining the equation of a line formed by points midway between said line projections;

storing said equation in a memory for reference; ordering said robot to said taught calibration point at a time of realignment; repeating said measuring step in a second measurement; repeating said processing step upon said second measurements; determining the required automated adjustments for orienting and translating said stream to minimize a spatial error derived from the result of said second measurement processing and said calibrating step reference equation; and developing signals to make said automated adjustments.

9. A method as in claim 8 wherein said spatial error is defined as the deviation of measured orientation of said stream from said reference.

10. A method as in claim 8 wherein said spatial error is defined as a function of a deviation of measured orientation of said stream from said reference plus a deviation of said stream position from said reference position as measured in a given intersecting plane.

11. A method for realigning a robot borne sprayed material stream requiring no adjustment of stream position or orientation relative to a robot arm supporting means forming said material stream, comprising the steps of: calibrating a robot borne sprayed material stream by: providing a three-dimensional measurement system; providing a robot with a sprayed material stream; teaching a calibration point to said robot such that said material stream is substantially centered in the measurements range of said measurement system; making a first measurement of the width of said stream with said measurement system at least two points along the length of said stream; processing said first measurements obtained from said measurement system; said processing comprising:

detecting the start and end of data along the width of said stream and making a list of start data and a list of end data; removing data from each list not correlating within a given tolerance to a line representative of the majority of data of said list; converting the remaining data of said lists to three-dimensional coordinate measurements, said data forming start and end three-dimensional list data; least square fitting said three-dimensional list data to lines in three-dimensional space with a line for each said list; least square fitting said three-dimensional list data to a plane with one plane for the combined data of said lists; projecting two of said lines in three-dimensions upon said plane along a surface normal of said plane; and determining the equation of a line formed by points midway between said line projections;

storing said equation in a memory for reference: ordering said robot to said taught calibration point at a time of realignment; repeating said measuring step in a second measurement; repeating said processing step upon said second measurements; determining offset values of said stream as measured in a given intersecting plane, said offset values being derived from the result of said second measurement processing and said calibrating step reference equation; developing path offset values for robot path modification; and entering said values.

12. A method for realigning a robot borne sprayed material stream requiring no adjustment of stream position or orientation relative to a robot arm supporting means forming said material stream, comprising the steps of: calibrating a robot borne sprayed material stream by: providing a three-dimensional measurement system; providing a robot with a sprayed material stream; teaching a calibration point to said robot such that said material stream is substantially centered in the measurements range of said measurement system; making a first measurement of the width of said stream with said measurement system at least two points along the length of said stream; processing said first measurements obtained from said measurement system; said processing comprising:

detecting the start and end of data along the width of said stream and making a list of start data and a list of end data; removing data from each list not correlating within a given tolerance to a line representative of the majority of data of said list; converting the remaining data of said lists to three-dimensional coordinate measurements, said data forming start and end three-dimensional list data; least square fitting said three-dimensional list data to lines in three-dimensional space with a line for each said list; least square fitting said three-dimensional list data to a plane with one plane for the combined data of said lists; projecting two of said lines in three-dimensions upon said plane along a surface normal of said plane; and determining the equation of a line formed by points midway between said line projections;
storing said equation in a memory for reference; ordering said robot to said taught calibration point at a time of realignment; repeating said measuring step in a second measurement; repeating said processing step upon said second measurements; determining the change in orientation and position of said stream as measured in a given intersecting plane and derived from the result of said second measurement processing and said calibrating step reference equation; developing changes in tool point position and orientation values; and entering said values.

13. An arrangement for providing alignment reference to assist visual alignment of a sprayed material stream comprising: a target disc with a centered hole large enough to permit passage of a sprayed material stream with given lateral offset errors; an alignment frame comprising:

a top annualar ring; a bottom annular ring; a pair of alignment bars at least at 90 degree increments around the circumference of said rings, said rings being connected and spaced apart by a distance sufficient to visually determine orientation alignment parallel to said bars, said bars of each pair being separated by an amount to allow visual determination of stream centering; and a shroud around a portion of said alignment frame blocking the view between two pair of said alignment bars located substantially 90 degrees apart but not blocking the view diametrically opposed to said alignment bar pairs; and compliant linkage of said target disc to the top of said alignment frame, said disc being centered on said alignment frame.

14. An arrangement as in claim 13 and comprising further centerline markings on said target disc, top annular ring and bottom annular ring.

15. An arrangement for providing automated adjustments for a spray gun comprising: a base mount with a yaw pivot about a yaw axis; a secondary yaw mount with a pitch pivot about a pitch axis, said yaw mount pivoting on said yaw pivot being driven by a controlled rotary motor on said base mount imparting yaw motion to said yaw mount via a mechanical coupling; a tertiary pitch mount for mounting a spray gun, said gun having an orifice for spraying material, said pitch mount pivoting on said pitch pivot and driven by a further controlled rotary motor on said base mount imparting pitch motion to said pitch mount via a mechanical coupling; said yaw axis and said pitch axis intersecting substantially perpendicularly; said orifice being located at the intersection of said yaw and pitch axes; and a motor driver for controlling said motors in response to input controlling signals.

16. An arrangement as in claim 15 wherein said orifice is offset from said intersection of said yaw and pitch axes.

17. Arrangement as in claim 15 wherein said yaw and pitch axes do not intersect.

18. An arrangement enabling measurement and realignment of a sprayed material stream comprising: means for making three-dimensional measurements of a sprayed material stream over a given length of said stream; processing means for determining the equation of the centerline of said stream; memory means for storing said equation, computer means for determining spatial errors between a measured stream equation and a stored reference stream equation within a given plane; controller means for developing motor drive signals proportional to said spatial errors; and a spray gun mount with motor-driven adjustments for orientation and translation.

* * * * *